United States Patent
Salonidis et al.

(10) Patent No.: US 11,514,361 B2
(45) Date of Patent: Nov. 29, 2022

(54) AUTOMATED ARTIFICIAL INTELLIGENCE RADIAL VISUALIZATION

(71) Applicant: INTERNATIONAL BUSINESS MACHINES CORPORATION, Armonk, NY (US)

(72) Inventors: Theodoros Salonidis, Wayne, PA (US); John Eversman, Austin, TX (US); Dakuo Wang, Cambridge, MA (US); Alex Swain, Cedar Park, TX (US); Gregory Bramble, Larchmont, NY (US); Lin Ju, Markham (CA); Nicholas Mazzitelli, Woodbridge (CA); Voranouth Supadulya, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 315 days.

(21) Appl. No.: 16/557,760

(22) Filed: Aug. 30, 2019

(65) Prior Publication Data

US 2021/0065048 A1    Mar. 4, 2021

(51) Int. Cl.
*G06F 3/0482* (2013.01)
*G06N 20/00* (2019.01)
(Continued)

(52) U.S. Cl.
CPC ........... *G06N 20/00* (2019.01); *G06F 3/0482* (2013.01); *G06F 9/3867* (2013.01); *G06F 9/542* (2013.01)

(58) Field of Classification Search
CPC .......... G06F 3/048; G06F 3/0482; G06F 9/38; G06F 9/54; G06F 3/04847; G06F 9/3867;
(Continued)

(56) References Cited

U.S. PATENT DOCUMENTS 10,810,491 B1 * 10/2020 Xia .......................... G06N 3/08
11,151,471 B2 * 10/2021 Niininen ............... H04L 41/147
(Continued)

FOREIGN PATENT DOCUMENTS

WO    2010001349 A1    1/2010

OTHER PUBLICATIONS

Meng et al.; ML Pipelines: A New High-Level API for MLlib; Jan. 7, 2015; databricks.com; pp. 1-10.*
(Continued)

*Primary Examiner* — Andrew R Dyer
(74) *Attorney, Agent, or Firm* — Griffiths & Seaton PLLC

(57) ABSTRACT

Embodiments for providing automated machine learning visualization. Machine learning tasks, transformers, and estimators may be received into one or more machine learning composition modules. The machine learning composition modules generate one or more machine learning models. A machine learning model pipeline is a sequence of transformers and estimators and an ensemble of machine learning pipelines are an ensemble of machine learning pipelines. A machine learning model pipeline, an ensemble of a plurality of machine learning model pipelines, or a combination thereof, along with corresponding metadata, may be generated using the machine learning composition modules. Metadata may be extracted from the machine learning model pipeline, the ensemble of a plurality of machine learning model pipelines, or combination thereof. An interactive visualization graphical user interface of the machine learning model pipeline, the ensemble of a plurality of machine learning model pipelines, or combination thereof, and the extracted metadata may be generated.

21 Claims, 12 Drawing Sheets

(51) Int. Cl.
*G06F 9/54* (2006.01)
*G06F 9/38* (2018.01)
(58) Field of Classification Search
CPC . G06F 9/542; G06N 3/08; G06N 5/00; G06N 20/00; G06N 20/20; G06N 5/003
USPC .......................................................... 706/12
See application file for complete search history.

(56) References Cited

U.S. PATENT DOCUMENTS

| | | | |
|---|---|---|---|
| 2012/0158623 A1 | 6/2012 | Bilenko et al. | |
| 2014/0122396 A1* | 5/2014 | Swaminathan | G06N 5/02 706/14 |
| 2016/0253423 A1* | 9/2016 | Rolia | G06Q 30/0241 707/711 |
| 2016/0253596 A1 | 9/2016 | Goth et al. | |
| 2017/0004270 A1* | 1/2017 | Van De Craen | G16H 10/60 |
| 2017/0017708 A1* | 1/2017 | Fuchs | G06F 16/288 |
| 2017/0090995 A1* | 3/2017 | Jubinski | G06F 16/25 |
| 2017/0206683 A1* | 7/2017 | Beckett | G06F 16/248 |
| 2018/0373781 A1* | 12/2018 | Palrecha | G06N 3/0427 |
| 2019/0102462 A1 | 4/2019 | Botea et al. | |
| 2019/0121889 A1* | 4/2019 | Gold | G06F 3/061 |
| 2019/0244113 A1 | 8/2019 | Ramos et al. | |
| 2020/0184044 A1* | 6/2020 | Zatloukal | G06N 3/0454 |
| 2021/0050080 A1* | 2/2021 | Warren | G16H 15/00 |
| 2021/0055915 A1* | 2/2021 | Guo | G06F 8/34 |

OTHER PUBLICATIONS

Training Sets, Validation Sets, and Holdout Sets; Apr. 21, 2019; datarobot.com; pp. 1-2.*
Prathamesh Sarang; Tutorial to deploy Machine Learning models in Production as APIs (using Flask); Sep. 28, 2017; www.analyticsvidhya.com; pp. 1-12.*
Montana Low; How to build a deep learning model in 15 minutes; tech.instacart.com; pp. 1-19.*

* cited by examiner

US 11,514,361 B2

AUTOMATED ARTIFICIAL INTELLIGENCE RADIAL VISUALIZATION

BACKGROUND OF THE INVENTION

Field of the Invention

The present invention relates in general to computing systems, and more particularly to, various embodiments for automated machine learning visualization by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine Learning is a form of artificial intelligence that is employed to allow computers to evolve behaviors based on empirical data.

SUMMARY OF THE INVENTION

Various embodiments for providing automated machine learning visualization by a processor, are provided. In one embodiment, by way of example only, a method for generating and constructing radial automated machine learning visualization, again by a processor, is provided. Machine learning ("ML") tasks, transformers, and estimators may be received into one or more machine learning composition modules. The one or more machine learning composition modules generate one or more machine learning models. A machine learning model pipeline, an ensemble of a plurality of machine learning model pipelines, or a combination thereof, along with corresponding metadata, may be generated using the one or more machine learning composition modules. Metadata may be extracted from the machine learning model pipeline, the ensemble of a plurality of machine learning model pipelines, or combination thereof. The extracted metadata and the machine learning model pipeline, the ensemble of a plurality of machine learning model pipelines, or a combination thereof may be ranked according to metadata ranking criteria and pipeline ranking criteria. An interactive visualization graphical user interface ("GUI") of the machine learning model pipeline, the ensemble of a plurality of machine learning model pipelines, or combination thereof, and the extracted metadata may be generated according to the rankings.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
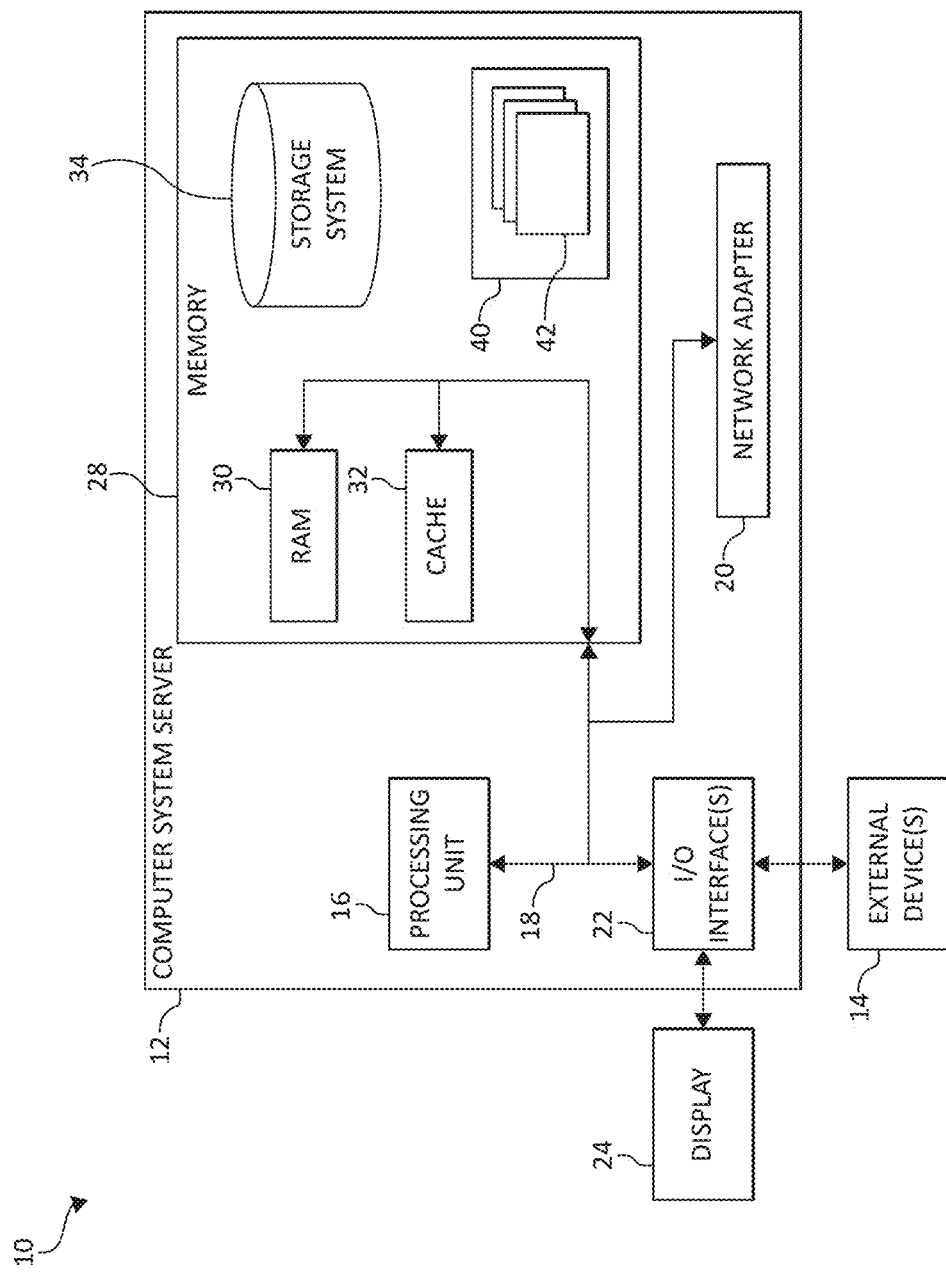
FIG. 1 is a block diagram depicting an exemplary cloud computing node according to an embodiment of the present invention.

Machine learning allows for an automated processing system (a "machine"), such as a computer system or specialized processing circuit, to develop generalizations about particular data sets and use the generalizations to solve associated problems by, for example, classifying new data. Once a machine learns generalizations from (or is trained using) known properties from the input or training data, it can apply the generalizations to future data to predict unknown properties.

In one aspect, automated artificial intelligent ("AI")/machine learning systems ("AutoAI systems") may generate multiple (e.g., hundreds) of machine learning pipelines. The AutoAI tool may output ML models and their ranking in leaderboards such as, for example, in a drop-down lists show only their estimators plus parameters. However, such limited detail and depth of information fails to actual show how each machine learning model structure or how such machine learning model pipelines were created. When there is a large number of such machine learning model pipelines, a user is unable to adequately assess the composition, makeup, and overall architectural design/development and performance of these structures (e.g., the user is unable to keep track of their structure and performance in a concise manner).

Accordingly, various embodiments of the present invention provide for automated machine learning radial visualization in a graphical user interface ("GUI"). Machine learning ("ML") tasks, transformers, and estimators may be received into one or more machine learning composition modules. The one or more machine learning composition modules generate one or more machine learning models. A machine learning model pipeline, an ensemble of a plurality of machine learning model pipelines, or a combination thereof, along with corresponding metadata, may be generated using the one or more machine learning composition modules. Metadata may be extracted from the machine learning model pipeline, the ensemble of a plurality of machine learning model pipelines, or combination thereof. The extracted metadata and the machine learning model pipeline, the ensemble of a plurality of machine learning model pipelines, or a combination thereof may be ranked according to metadata ranking criteria and pipeline ranking criteria. An interactive visualization graphical user interface ("GUI") of the machine learning model pipeline, the ensemble of a plurality of machine learning model pipelines, or combination thereof, and the extracted metadata may be generated according to the rankings.

In an additional aspect, machine learning models, ML tasks, selected data transformers, and selected data estimators may be input into one or more ML composition modules. A ML model pipeline, an ensemble of a plurality of ML model pipelines, or a combination thereof, along with corresponding metadata, may be generated from the one or more ML composition modules. The metadata may be extracted from the ML model pipeline, the ensemble of a plurality of ML model pipelines, or combination thereof. The ML model pipeline, the ensemble of a plurality of ML model pipelines, or a combination thereof, and their associated metadata components (such as, for example, data, estimators, transformers, composition modules) may be ranked according to the metadata and model pipeline and metadata ranking criterion. An interactive visualization graphical user interface ("GUI") of the ML model pipeline, the ensemble of a plurality of ML model pipelines, or combination thereof may be generated according to the ranking.

In an additional aspect, the ML tasks, transformers, and estimators may be received (as input data) into one or more machine learning composition modules. The one or more machine learning composition modules generate one or more machine learning models. A machine learning model pipeline is a sequence of transformers and estimators and an ensemble of machine learning pipelines (e.g., a machine learning model pipeline as a sequence of data transformers followed by an estimator algorithm) are an ensemble of machine learning pipelines. A machine learning model pipeline, an ensemble of a plurality of machine learning model pipelines, or a combination thereof, along with corresponding metadata, may be generated using the one or more machine learning composition modules. Metadata may be extracted from the machine learning model pipeline, the ensemble of a plurality of machine learning model pipelines, or combination thereof. An interactive visualization graphical user interface ("GUI") of the machine learning model pipeline, the ensemble of a plurality of machine learning model pipelines, or combination thereof, and the extracted metadata may be generated.

In one aspect, the present invention provides for the generation and visualization of machine learning models. Each machine learning model may be implemented as a pipeline or as an ensemble of multiple pipelines. Following any training operation, a machine learning model pipeline can receive test data and pass the test data through a sequence of data transformations (e.g., preprocessing, data cleaning, feature engineering, mathematical transformations, etc.) and may use an estimator operation of the estimators (e.g., Logistic Regression, Gradient Boosting Trees, etc.) to yield predictions for the test data.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
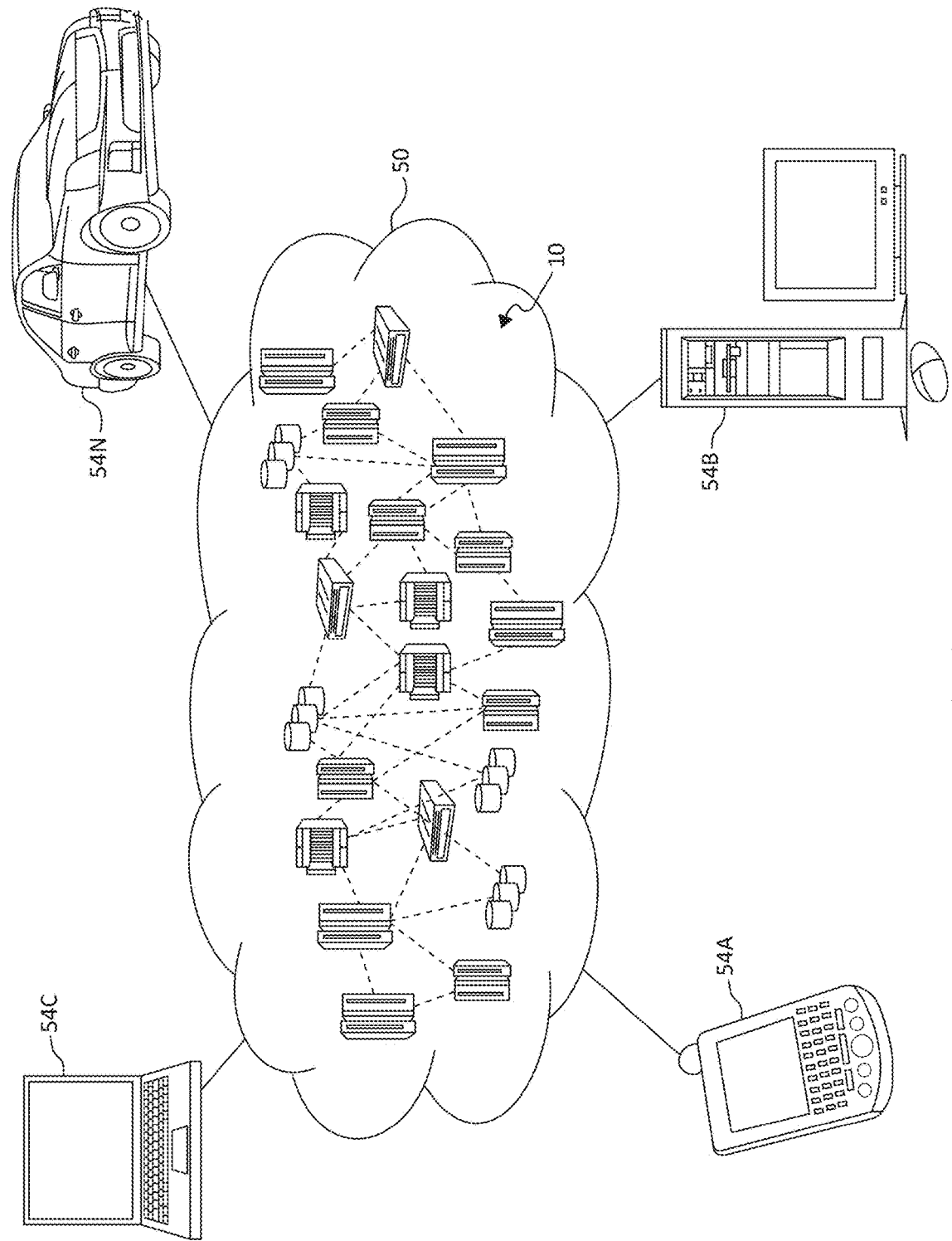
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
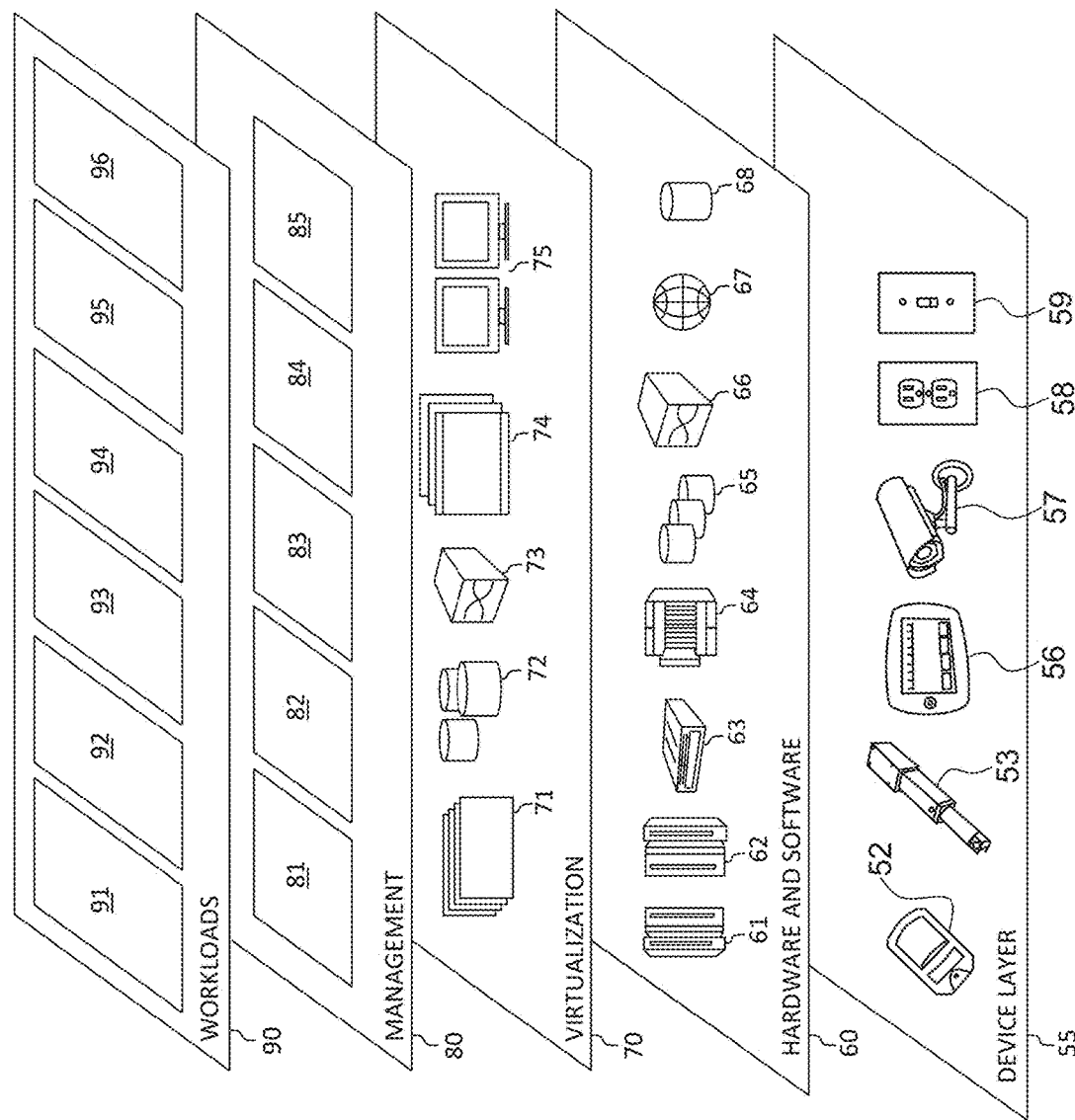
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing radial automated machine learning visualization. In addition, workloads and functions 96 for providing radial automated machine learning visualization may include such operations as data analytics, data analysis, and as will be further described, notification functionality. One of ordinary skill in the art will appreciate that the workloads and functions 96 for providing radial automated machine learning visualization may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for a radial automated machine learning visualization in a GUI where the GUI is in association/communication with an automated machine learning backend and frontend system. The automated machine learning backend system may receive and/or assemble one or more machine learning models, one or more machine learning tasks, one or more selected data transformers, and one or more selected data estimators into one or more machine learning composition structures.

In an additional aspect, the present invention provides for automated machine learning radial visualization to illustrate the composition, makeup, and overall architectural design/development and performance of machine learning models and pipelines. In one aspect, one or more machine learning tasks, candidate data transformers, and estimators may be received as input into an automatic machine learning system (e.g., in a backend of a computing system such as, for example, an Auto-AI system). The machine learning tasks may each include training dataset, optimization metric, labels, and other defined tasks.

The machine learning models (and their composition, makeup, architecture, performance, training data, data transformers, and/or data estimators) may be combined into one or more machine learning composition components. One or more machine learning model pipelines composed of the machine learning composition structure components that may include the data transformers and estimators) may be generated along with their metadata and provided from the backend of a computing system.

One or more machine learning model pipelines (e.g., one or more machine learning models and metadata) may be received by the computing system (e.g., a front end of an automatic machine learning system) from the automatic machine learning system (e.g., an Auto-AI backend). The machine learning model metadata may be excluded such as, for example, data partition data (e.g., training/holdout if applicable), a machine learning model structure such as, for example, data transformers and data estimators (e.g., as sequence of transformers and estimator pipeline) and parameters, data scores relating to the training/holdout metric, and/or provenance data (e.g., sequence of composition algorithm modules or "machine learning composition structures"). A ranking of the machine learning pipelines may be determined based on the metadata, ranking criterion, and/or various metrics. For each metric, a minimum/maximum value may be determined. It should be noted that the metrics are as part of the ML task input to the automatic machine learning system (e.g., AutoAI system) and based on which models are generated. Example metrics may include, for example, accuracy, precision, ROC/AUC, root-mean-squared-error,f1 score etc (for classification problems), and/or other for regression problems. In one aspect, the ML task has at least one optimization metrics which may be used to create optimized model pipelines based on these metrics and one or more evaluation metrics (used to evaluate the resulting pipelines). Metrics with arithmetic values such as, for example, accuracy may also have minimum and maximum values. The present invention determines/computes minimum and maximum metric value to show the pipeline nodes sorted on the pipeline ring and also show annotations on these metrics. For example, if accuracy metric is selected for ranking, the pipeline ring will show the minimum and maximum values and then the pipeline nodes will be placed on the ring based on their accuracy scores.

An extracted and/or decomposed machine learning model metadata may be provided to (e.g., placed on) on an interactive radial user interface ("UP") that may include multiple concentric rings. For example, the concentric rings may include: 1) one or more data rings denoting the data fold used for model training, 2) one or more estimator rings containing all available estimators, transformer ring containing all available transformers, 3) one or more provenance rings containing the machine learning composition modules (e.g., composition algorithm modules). In one aspect, the machine learning composition modules may execute/run an algorithm/operation that takes, as input, a ML task (dataset, metrics, target, etc), transformers and estimators, and outputs machine learning model pipelines.

In one aspect, examples of the machine learning composition modules include, but are not limited to: 1) preprocessing/data cleaning to translate raw data to numerical format; 2) hyper-parameter optimization (HPO) to identify/find optimal hyper-parameters for a pipeline given a dataset; 3) model selection to select and rank a given set of machine learning pipelines for a given dataset; 4) feature engineering to perform data transformations and adds/deletes new features to a dataset; 5) ensembling to create ensembles based on a set of machine learning pipelines and/or dataset; 6) an automatic model generation module (e.g. black box automatic model generation module using an existing AutoAI framework) based on the given ML task (e.g., training, holdout/test datasets, optimization/evaluation metrics, target variables, etc.), transformers and estimators input to the backend system, and/or 7) human-driven model generation module (e.g., driven by human users creating data based on the given training dataset, transformers and estimators input to the backend system).

Each machine learning model pipeline node in a radial UI (e.g., in a pipeline ring) to its estimator, transformers, composition modules in the, estimator ring and transformer and composition rings, respectively. Each data transformers may be annotated with their sequence of appearance in the machine learning model pipeline.

Figure 4A:
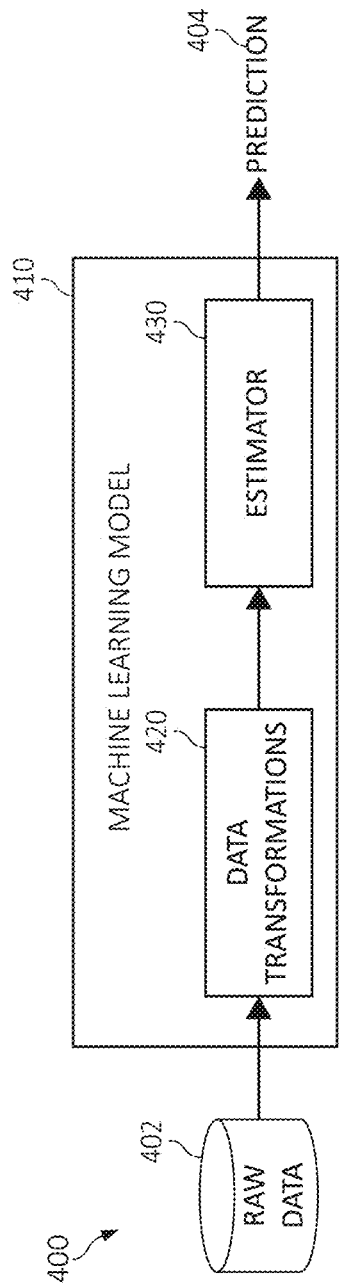
FIG. 4A is an additional block diagram depicting a machine learning model in accordance with aspects of the present invention.
Figure 4B:
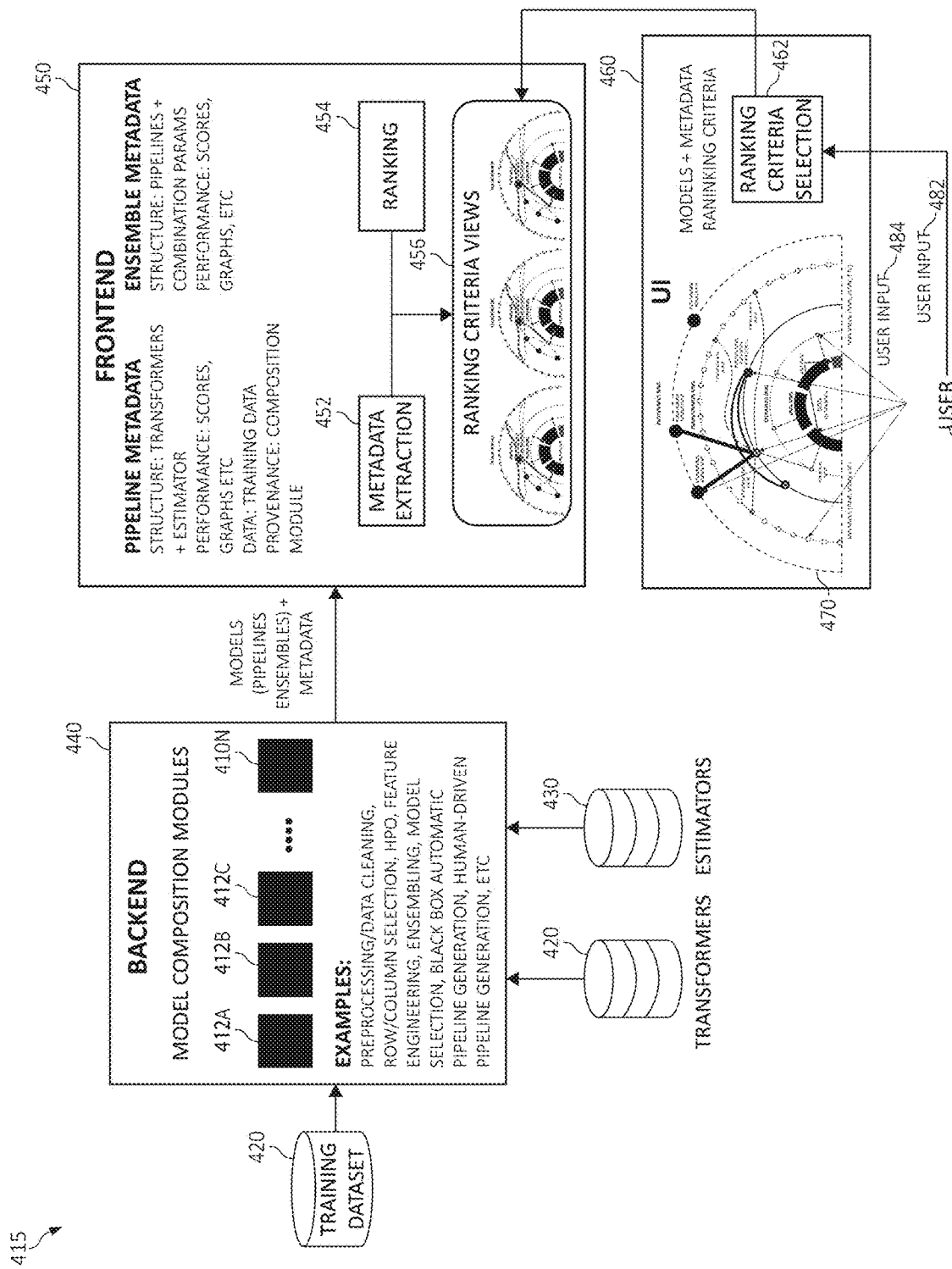
FIG. 4B-4C are additional block diagrams depicting various implementing automated machine learning radial visualization in a graphical user interface using machine learning models in accordance with aspects of the present invention.
Figure 4C:
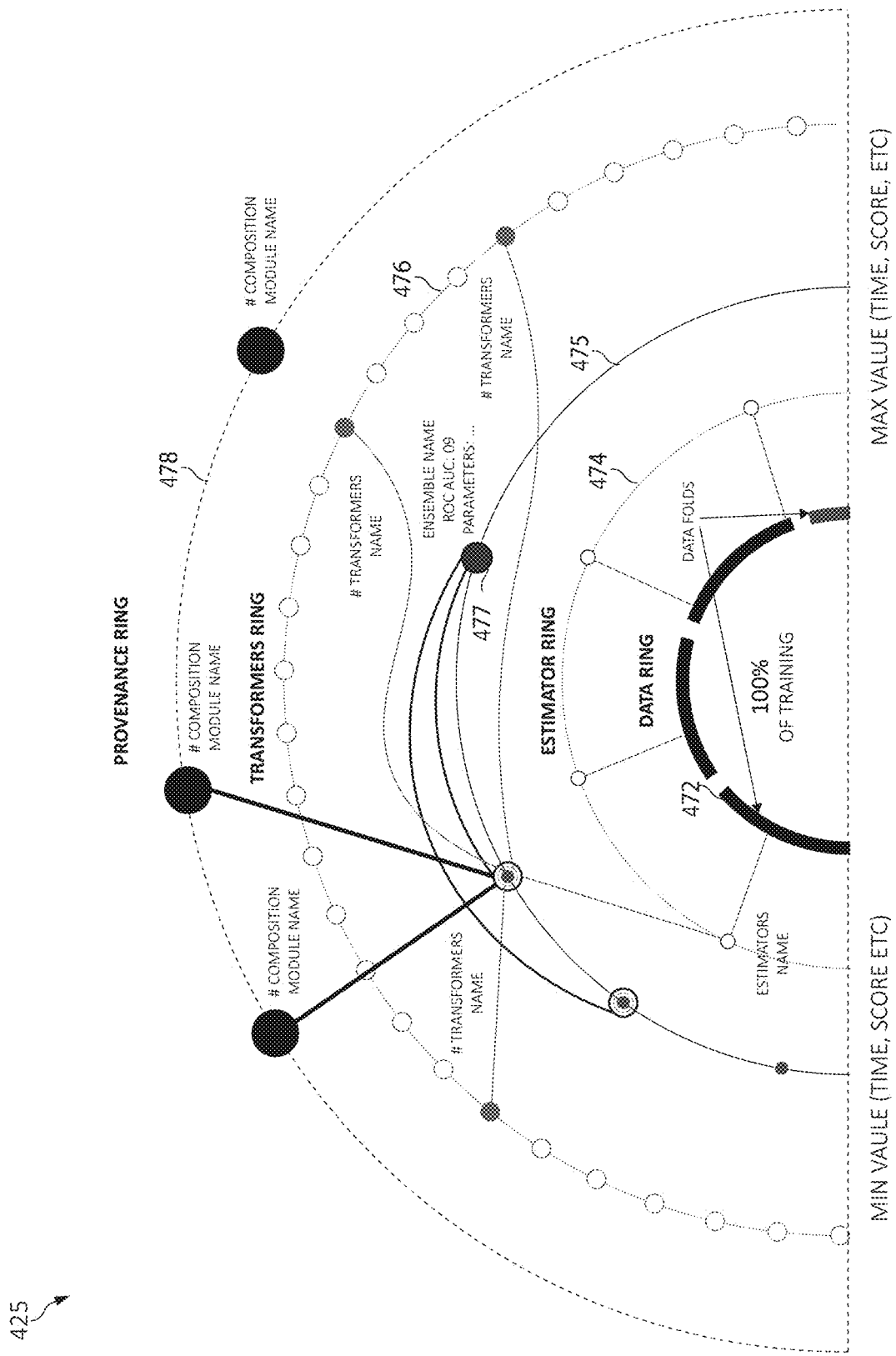

Turning now to FIGS. 4A-4C, block diagrams depicting exemplary functional components 400, 415, and 425 according to various mechanisms of the illustrated embodiments is shown. In one aspect, one or more of the components, modules, services, applications, and/or functions described in FIGS. 1-3 may be used in FIG. 4.

As illustrated in FIG. 4A, a machine learning pipeline structure 400 is depicted. In one aspect, machine learning pipeline structure 400 may perform various computational, data processing and other functionality in accordance with various aspects of the present invention. The machine learning pipeline structure 400 may be provided by the computer system/server 12 of FIG. 1.

As one of ordinary skill in the art will appreciate, the depiction of the various functional units in machine learning pipeline structure 400 is for purposes of illustration, as the functional units may be located within the machine learning pipeline structure 400 or elsewhere within and/or between distributed computing components.

For example, the machine learning pipeline structure 400 may include one or more machine learning model 410. The machine learning model 410 may include one or more data transformations 420 and one or more estimators 430. In operation, raw data 402 may be provided to the machine learning model 410 where one or more machine learning operations may be performed using the data transformations 420 and/or estimators 430 to provide a prediction 404.

Turning now to FIG. 4B, the present invention provides for a backend automatic machine learning system 440 and a frontend automatic machine learning system 450 (e.g., a frontend/UI sub-system). In one aspect, the backend automatic machine learning system 440 and/or a frontend automatic machine learning system 450 may be internal to and/or external to the computer system/server 12 of FIG. 1.

The frontend automatic machine learning system 450 may include a metadata extraction module 452 and/or a ranking module 454. The frontend automatic machine learning system 450 may also be in communication with interactive visualization GUI 460 (e.g., an interactive radial visualization GUI).

In one aspect, the backend automatic machine learning system 440 may include one or more machine learning models 410 of FIG. 4A, which may be herein after referred to as machine learning composition structures 412A-N. The backend automatic machine learning system 440 may receive as input a training dataset 414, a set of candidate data transformers 420 and candidate estimators 430.

The backend automatic machine learning system 440 may assemble training dataset 420, a set of data transformers 420 (e.g., candidate data transformers and/or selected data transformers) and selected/candidate estimators 430 (and/or also one or more machine learning models 410, one or more machine learning tasks) into one or more machine learning composition structures such as, for example, the machine learning composition structures 412A-N. In one aspect, the machine learning composition structures 412A-N may include one or more machine learning models, one or more selected data transformers 420, and one or more candidate estimators 430.

In one aspect, a machine learning composition structure or a combination of such as, for example, the machine learning composition structures 412A-N may be used to generate each model pipeline output by the backend automatic machine learning system 440 (e.g., backend subsystem). In one aspect, examples of machine learning composition structures 412A-N may include and/or perform one or more operations such as, for example: 1) preprocessing/data cleaning: translates raw data to numerical format, 2) Hyper-parameter optimization ("HPO") that locates, finds, identifies one or more optimal hyper-parameters for a pipeline given a dataset, 3) machine learning model selection that ranks a given set of machine learning pipeline models for a given ML task (training data, holdout/test dataset, metrics, target variables, etc.), 4) feature engineering that performs data transformations and adds/deletes new features to a dataset, 5) ensembling that creates an ensemble (e.g., a machine learning model pipeline ensemble) based on a set of pipelines and/or dataset, 6) a black box automatic model generation module (e.g., using an existing AutoAI framework) based on the given training dataset 414, transformers 420, and estimators 430 input to the backend automatic machine learning system 440, and/or 7) one or more human-driven model generation modules (driven by users creating data based on the given training dataset 414, transformers 420, and estimators 430 input to the backend automatic machine learning system 440.

Thus, the backend automatic machine learning system 440 may generate a machine learning model pipeline, an ensemble of a plurality of machine learning model pipelines, or a combination thereof along with corresponding metadata from the one or more machine learning composition structures. Thus, the backend automatic machine learning system 440 may output a set of machine learning models and their associated metadata (including, but not limited to, metadata relating to the selected data transformers 420, the selected data estimators 430, and/or performance/metric metadata, etc.), which may be included in the machine learning model pipeline and/or in the ensemble of a plurality of machine learning model pipelines. It should be noted that provenance metadata of each generated model pipeline may be a list or sequence of machine learning composition structures 412A-N that were used to create the generated model pipeline and/or ensemble of a plurality of generated model pipelines. It should be noted that as used herein "provenance metadata" may refers to metadata describing how a machine learning model pipeline was generated. For example, if a machine learning model pipeline is associated with a composition module called "ACME AutoAI" then an "ACME AutoAI algorithm" is used to find this machine learning model pipeline. Provenance may refer to what data or what ML task was used to create the particular machine learning model pipeline.

In one aspect, the frontend automatic machine learning system 450 may receive the machine learning model pipeline and/or in the ensemble of a plurality of machine learning model pipelines (e.g., the machine learning models and/or machine learning composition structures 412A-N) from the backend automatic machine learning system 440. The frontend automatic machine learning system 450 may extract the associated metadata from the machine learning model pipeline and/or in the ensemble of a plurality of machine learning model pipelines (e.g., the machine learning composition structures 412A-N). The frontend automatic machine learning system 450 may generate and/or produce one or more interactive visualization views of the machine learning model pipeline and/or in the ensemble of a plurality of machine learning model pipelines (e.g., the machine learning models and/or machine learning composition structures 412A-N) and the associated metadata properties that are presented to the user based on various ranking criteria. The visualization view is dynamically updated as new models input over time. During training or after training, the user can interact with this visualization to discover a wide range of model pipeline properties and the training task at hand.

In one aspect, the metadata extraction module 452 may extract metadata from the incoming machine learning model pipeline and/or in the ensemble of a plurality of machine learning model pipelines (which can be either single pipelines or pipeline ensembles).

In one aspect, the metadata of each machine model pipeline may include, but not limited to: 1) a machine learning model structure that includes those data transformers 420 and estimators 430 along with their associated parameters using in the machine learning model, 2) performance metadata that may include scores on training set (e.g., holdout set if applicable) for multiple metrics (e.g., if there are multiple metrics (e.g., ROC_AUC, accuracy, precision, recall, f1 score etc.) during training, the predictions of each generated machine learning model pipeline may be evaluated (scored) based on the above metrics. Also, it is possible to have a training set, or a test/holdout set which is not used for training and generating pipelines. it is only used for evaluation. 3) one or more graphs based on the scoring data such as, for example, confusion matrix, receiver operation characteristic "ROC"/area under the curve ("AUC") curves, etc., 4) data such as, for example, training data 420 (or a subset of) used to generate the particular machine learning model pipeline, 5) provenance data, 6) composition modules (e.g., machine learning composition structures 412A-N) that include the composition modules (and their parameters, if any) of the backend automatic machine learning system 440 that were used to generate the particular machine learning model, and/or 7) time of creation data.

In an alternative aspect, the metadata of each ensemble of a plurality of machine learning model pipelines may include, but not limited to: 1) a machine learning model pipeline structure, 2) parameters such as, for example, parameters that determine the way/manner the plurality of machine learning model pipelines were ensembled, 3) performance metadata that may include scores on training set (e.g., holdout set if applicable) for multiple metrics (e.g., accuracy, receiver operation characteristic "ROC"/area under the curve ("AUC") curves, etc.), 4) one or more graphs based on the scoring data such as, for confusion matrix, ROC/AUC curves, etc., 5) data such as, for example, training data 420 (or a subset of) used to generate the particular machine learning model pipeline ensemble, 5) provenance data, 6) composition modules (e.g., machine learning composition structures 412A-N) that include the composition modules (and their parameters, if any) of the backend automatic machine learning system 440 that were used to generate the particular machine learning model, and/or 7) time of creation data.

In one aspect, the ranking module 454 may receive, as input, the extracted metadata of existing machine learning model pipelines and incoming machine learning model pipelines, and outputs different rankings on models, transformers, estimators, or composition modules. For each ranking that has numerical values, a minimum and maximum ranking value is also computed.

The ranking module 454 may rank each of the machine learning model pipeline and/or in the ensemble of a plurality of machine learning model pipelines according to ranking criteria. For example, in one aspect, the ranking criteria may include for example: 1) no ranking (e.g., arbitrary), 2) creation time (which may be a default), 3) training (cross-validation) score for different machine learning metrics (e.g., accuracy, precision, ROC/AUC, root-mean-squared-error, etc.), 4) holdout (or test) score for different machine learning metrics (such as accuracy, precision, ROC/AUC, root-mean-squared-error, etc.)

In one aspect, the ranking module 454 may rank transformers 420, data folds (e.g., during training, data may be partitioned in data folds, which are subsets of the original dataset and the datafolds may be displayed in the interactive GUI), estimators 420 and composition modules (e.g., the machine learning composition structures 412A-N) according to the according to additional ranking criteria: For example, in one aspect, the additional ranking criteria may include for example: 1) no ranking (e.g., arbitrary), 2) alphabetic name order (which may be a default), 3) frequency of usage in current pipelines, 4) visualization optimization criteria, 5) size (for data folds), and/or 5) an average score (of the pipelines it is used on).

The automated machine learning frontend system 450 may also include default ranking criteria where a user 480 is enabled to submit user input 482, for example, and may change the ranking criteria by interacting with the automated machine learning frontend system 450. Each combination of ranking criteria selection 462 may yields a different ranking criteria views 456 presented to the user 480.

Given ranking criteria such as, for example, the ranking criteria selection 462, the machine learning model's metadata, the machine learning models, data estimators 430, data transformers 420, and composition modules (e.g., the machine learning composition structures 412A-N) may each be placed according to their ranking criteria on a radial user interface ("UI") 470 (e.g., a radial UI visualization view), of the interactive visualization GUI 460, that may include one or more concentric rings, which is depicted also in FIG. 4C.

As illustrated in FIG. 4C, the radial UI visualization 470 presented to the user. The order of rings in the radial UI visualization 470 may vary depending on the application, optimization of visualization or user preferences. Once the model metadata is extracted/generated, the metadata may be placed as a node (e.g., circle-like dots on each ring by way of example only) on the radial UI visualization 470 that include multiple concentric rings. The concentric rings of the radial UI visualization 470 may include, for example: 1) pipeline rings 475 containing all available model pipelines and pipeline ensembles, 2) data rings 472 containing the training data partitions (and holdout data partitions if available) used for training the pipelines, 3) estimator(s) ring 474 containing all available estimators (that are input to backend training sub-system), 4) transformer(s) ring 476 containing all available transformers (that are input to backend training sub-system), 5) provenance ring 478 containing all available composition modules/machine learning composition structures 412A-N (of the automated machine learning backend system 440).

The radial UI visualization 470 may include a radial leaderboard. That is, pipelines may be sorted on different ranking criteria (e.g., training score, holdout score, creation time, etc.). A minimum and maximum value may be determined for each ranking criteria that may be indicated on the ring ends. Also, pipeline metadata (e.g., machine learning pipelines, machine learning models, data folds, estimators, transformers, composition modules/machine learning composition structures 412A-N) may be sorted from the minimum value to maximum value according to their ranking criterion used in the view of the radial UI visualization 470. Minimum and maximum values for the current ranking criterion may be shown at the ends of each ring. In this way, the user (e.g., user 480) can visualize in a concise way, how machine learning model pipelines, as well as the metadata of the machine learning model pipeline, are ranked according to different criteria. As an alternative to the radial leaderboard, it is possible to depict the ranked pipelines and metadata on a linear leaderboard.

In an additional aspect, the radial UI visualization 470 may be automatically updated when one or more events (e.g., triggering events) occur. For example, the triggering events may include one or more of the following.

A trigger event may be added when new machine learning model pipelines are input to the automated machine learning frontend system 450. In this case, the machine learning model pipeline may be placed as a new node in the pipeline ring 475 and labeled by the identifier ("ID") and optionally the value according to the ranking criterion. In addition, one or more connections (e.g., connecting lines by way of example only) may be depicted/shown to its metadata nodes (e.g., transformers, estimators, data folds, composition modules) on their respective rings.

A trigger event may be at the beginning of the training process when training data enters the automated machine learning backend system 440 and is partitioned in training/holdout folds and the data ring is updated with the data folds. Data fold statistics may also be displayed on the radial view.

A trigger event may be when a model selection module is present and executed in the automated machine learning backend system 440 and the estimator ring and/or pipeline rings can be updated by keeping (or highlighting) top-K ranked machine learning model pipelines or estimators on the rings and deleting (or fading out) the rest.

A trigger event may be when an HPO composition module is present and executed in the automated machine learning backend system 440 and the corresponding pipeline and pipeline ring exhibits additional spinning rings around it to denote the layers of HPO optimization.

It should also be noted that the radial UI visualization 470 may updated one or more of the plurality of rings. For example, the data ring may be updated when new training data are input to the automated machine learning backend system 440. The transformer ring may be updated when new transformers are input to the automated machine learning backend system 440. The estimators ring may be updated when new estimators are input to the automated machine learning backend system 440. The provenance ring may be updated when new composition modules are added to the (backend) system.

In an additional aspect, the radial UI visualization 470 may be automatically updated when a user performs one or more events. For example, the user events (e.g., user-initiated triggering events) may include one or more of the following.

In one aspect, the radial UI visualization 470 may be automatically updated when the user selects ranking criteria. The entire radial UI visualization 470 is updated to reflect these criteria by resorting the pipelines and their metadata in the radial view.

The radial UI visualization 470 may be automatically updated when the user selects, clicks or hovers over a model pipeline node on the pipeline ring 475. The pipeline node may be labeled with its value (e.g., score, creation time, etc.)

corresponding to the pipeline ranking criterion of the current view of the radial UI visualization 470. The connections of the pipeline node to its metadata nodes (e.g., estimators, transformers, composition modules and data folds) in their respective rings may be featured, depicted, and/or highlighted. In addition, the metadata nodes may be labeled with the parameters of their instances for this particular pipeline. More in-depth information on this pipeline can be shown on a separate window or pop-up window, including ROC/AUC curves (e.g., binary classification problem), scatterplot of predicted as compared to measured values (e.g., a regression problem), scores on all supported metrics for the type of problem, etc.

The radial UI visualization 470 may be automatically updated when the user selects, clicks or hovers over a model pipeline ensemble node 477 such as, for example, model pipeline ensemble 477 in the pipeline ring 475. The model pipeline ensemble node 477 (e.g., a pipeline ensemble node that may have connections to one or more pipelines that comprises it) may be labeled with its value (score, creation, parameters, time, etc.) corresponding to the pipelines ranking criterion of the current radial UI visualization 470 view. In one aspect, the Metadata nodes are nodes in metadata rings such as, for example, data rings, transformers rings, estimators rings, composition module rings (e.g., essentially any node in this rings that is not pipeline or ensemble). That is, the metadata nodes are non-pipeline/ensemble nodes. For example, the metadata nodes can include data folds (partitions), transformers, estimators, composition modules etc.

The pipeline nodes on the pipeline ring 475, and/or the data in data ring 472 associated with the model pipeline ensemble node 477 may be illustrated, depicted, highlighted, along with their connections to their metadata. The ensemble parameters that may specify the combination rules of their pipelines and data may be provided.

The radial UI visualization 470 may be automatically updated when the user selects, clicks or hovers over a metadata (e.g., estimator, transformer, composition module or data fold) (or group of metadata) in their corresponding ring. All instances of this metadata (or group of metadata) are shown on a new temporary instances ring, labeled with their occurrence statistics (number, frequency, or ratios) with respect to the metadata. The connections of this metadata node (or group of) to all models in the pipelines ring where this metadata (or group of) is used may be illustrated.

The metadata node may be labeled with its occurrence statistics (e.g., number, frequencies, or ratios) to the models in the pipelines ring. For example, when an estimator is selected in the estimators ring 474: 1) a new ring with all instances of this estimator name may be depicted, each labeled with their number of occurrences. Selecting each such instance can show its detailed parameters, 2) all connections to the models in the pipelines ring where this estimator is used are shown, and/or 3) the estimator node in the estimators ring 474 is labeled with its number of occurrences on the models in the pipeline ring 475. The same type of visualization update holds for other metadata such as transformers, composition modules, and data folds.

Thus, radial UI visualization 470 may be automatically updated/switched between different metric views when the user 1) selects a pipeline to view details about it (e.g., enables viewing of scores, transformer parameters, estimator parameters (e.g., upon hovering on a selected area of the radial UI), composition modules, 2) selects a transformers to view pipelines associated with it, 3) selects an estimators to view pipelines associated with it, 4) selects a on data partitions to view pipelines associated with it, and/or 5) selects a composition modules to view pipelines associated with it.

In view of FIG. 4, FIG. 5A-5J further depicting various radial visualization GUI views 500, 515, 525, 535, 545, 555, 565, 575, 585, and 595 of various automated machine learning radial visualization components in a graphical user interface depicting structures of machine learning model and pipelines. In one aspect, one or more of the components, modules, services, applications, and/or functions described in FIGS. 1-4 may be used in FIGS. 5A-5J. Repetitive description of like elements employed in other embodiments described herein (e.g., FIGS. 1-4) is omitted for sake of brevity.

Preprocessing

Figure 5A:
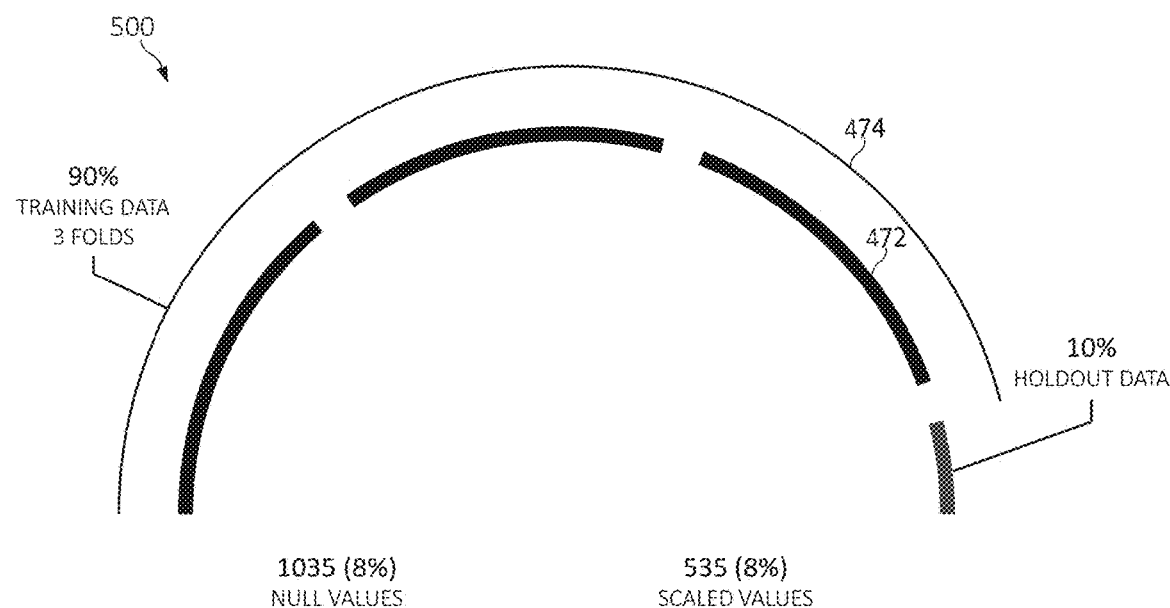
FIG. 5A-5J are additional block diagrams depicting various views of an automated machine learning radial visualization in a graphical user interface using machine learning models in accordance with aspects of the present invention.

As depicted in FIG. 5A, a preprocessing operation may occur where a core node of the radial visualization GUI 500 (see also 470 of FIG. 4C) utilizes different arcs to represent the data split with additional segments to represent layers of "partitioning" for a percentage of data used for training and testing such as, for example, 90% training data, 10% holdout data, etc. Said differently, the visualization (e.g., radial UI visualization 470) progressively build out and adds arcs, layers, and nodes as it is in progress. The core node of the radial visualization GUI 500 utilizes different rings (e.g., data ring 474 and estimator ring 474) to represent a different subset of the data, with additional segments to represent an additional layers of "partitioning" for percentage of data to be used for training, holdout and test purpose.

Model Selection

Figure 5B:
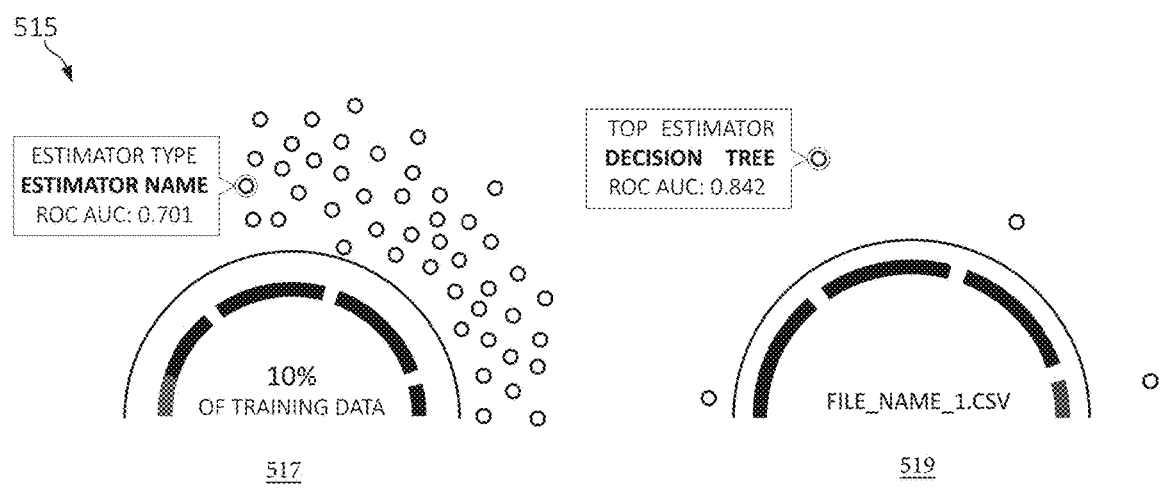
Figure 5C:
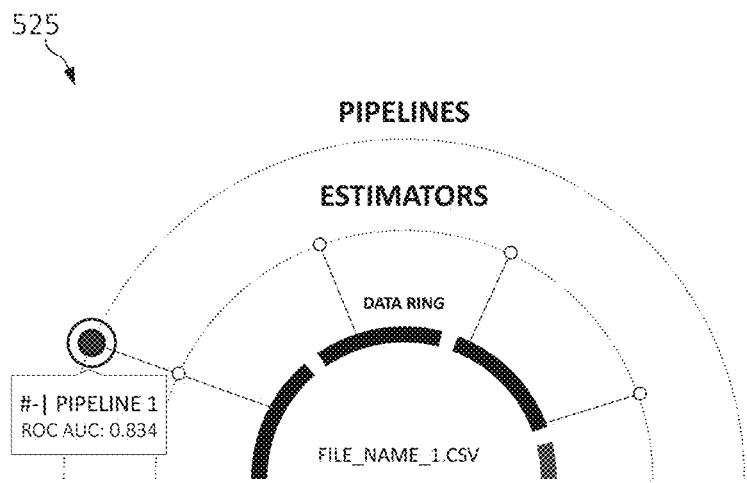

In FIG. 5B-5C, a model selection operation may be performed. For example, a machine learning model selection may be performed where machine learning model selection phases are represented by arcs around the data source node (e.g., "File_Name_1.CSV"). In one aspect, nodes may be added to the arc, each representing an individual estimator, or their associated pipelines. For example, clicking on a node may cause a machine learning pipeline to connect to inner estimator nodes to indicate which estimator was used to generate that particular pipeline (e.g., Pipeline 1 with a ROC/AUC score of 0.843). That is, the core node (in FIG. 5A-5C or "File_Name_1.CSV") may shrink and reveals next level of nodes behind it (in this case, Estimators), as illustrated in FIG. 5C. It should be noted that the order of the rings can be interchanged. For example, "inner" could be used in reference to the FIG. 5B-5C but the rings cold have different order in general.

It should be noted that the "candidate estimators" (e.g., the small hollow circles above the GUI 517 may represent a plurality of estimators. GUI 517 illustrates a user interaction on one estimator (e.g., clicks or hovers over the estimator node) and displays detailed information such as, for example, estimator type, the name of the estimator, and/or ROC_AUC with the score 0.701. After one or more of the estimators has been selected, GUI 519 depicts that selected estimators which are now the only estimators that are displayed. GUI 519 illustrates a user interaction on one of the selected estimator (e.g., clicks or hovers over the estimator node) and displays detailed information such as, for example, the top ranked estimator, the name of the estimator (e.g., decision tree), and/or ROC_AUC with the score 0.842. It should be noted, the based on user configuration, application, or product, the GUI 519 may selectively display (or do not display) the estimators. For example, in one aspect, GUI 519 hides all non-selected estimators while displaying all selected estimators. In an additional aspect, the GUI 519 display all non-selected estimators but may more prominently display all selected estimators (e.g., highlight, flash, provide a spinning ring, etc.). Thus, the interactive GUI (e.g., the radial UI visualization 470) may selectively display, hide, highlight, or place emphasis upon or de-emphasize one or more components, features, rings, or nodes according to user preferences or technological capabilities of a computing/media display device.

As these nodes are being utilized in the process, the visualization operations may refine top performing nodes (e.g., pipeline 1 and pipeline 2 of FIG. 5A-5C such as, for example, ROC/AUC 0.834 and 0.830) along the way until the top number of selected performers (e.g., the numbers being defined by user) is determined. Once a top number of performers are selected, another layer/arc may be added outside of the previous arc. A new node type may be added on the new arc with a connection to the category (e.g., estimator) that it belongs to.

Hyperparameter Optimization

Figure 5D:
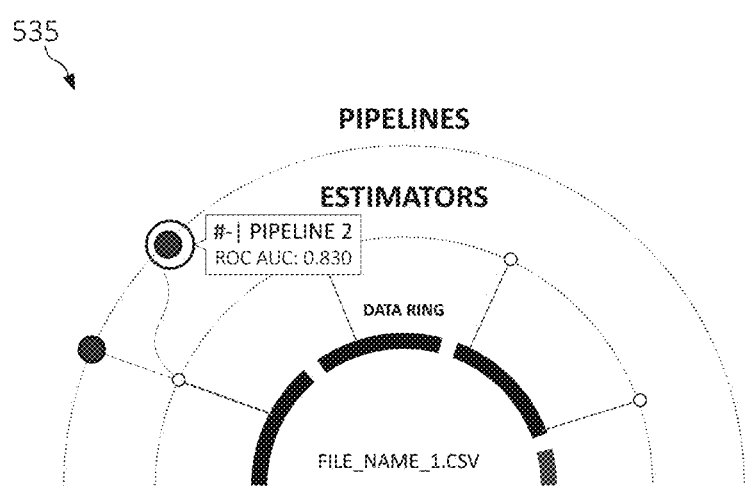
Figure 5E:
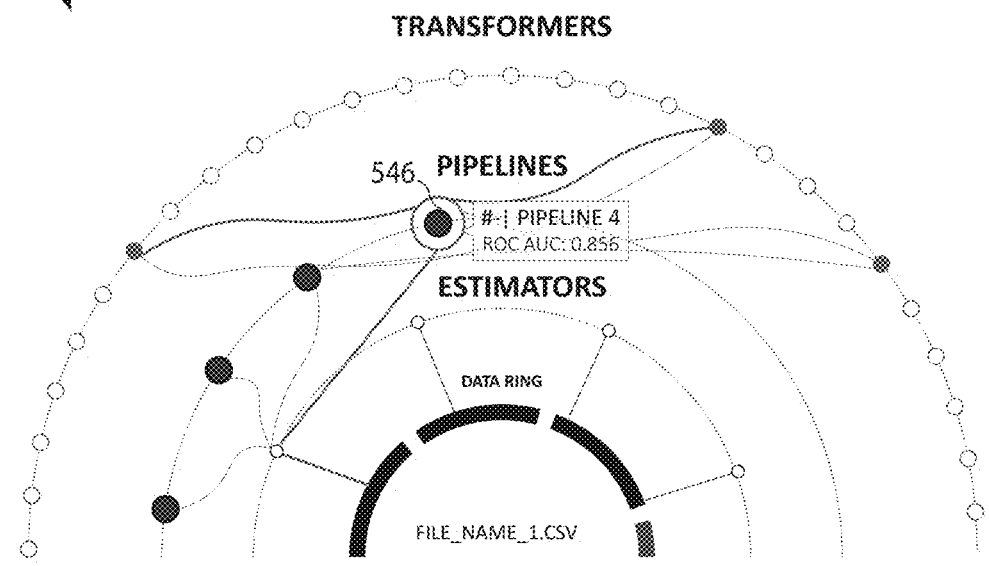

As illustrated in FIGS. 5D-5E, a Hyperparameter Optimization operation is depicted where the number of rings around an individual pipeline node represent the layers of Hyperparameter Optimization that are being performed on that pipeline. A spinning ring (e.g., a rotating motion on the ring to illustrate some underlying activity/operation such as, for example, an optimizing operation) is used to represent a pipeline that is actively being optimized (e.g., pipeline 2 with a ROC/AUC of 0.830). A new node (e.g., pipeline #2) may be duplicated from the previous node's (e.g., pipeline 1) properties with an added spinning ring to indicate that parameters are being modified/optimized.

Feature Engineering

Figure 5F:
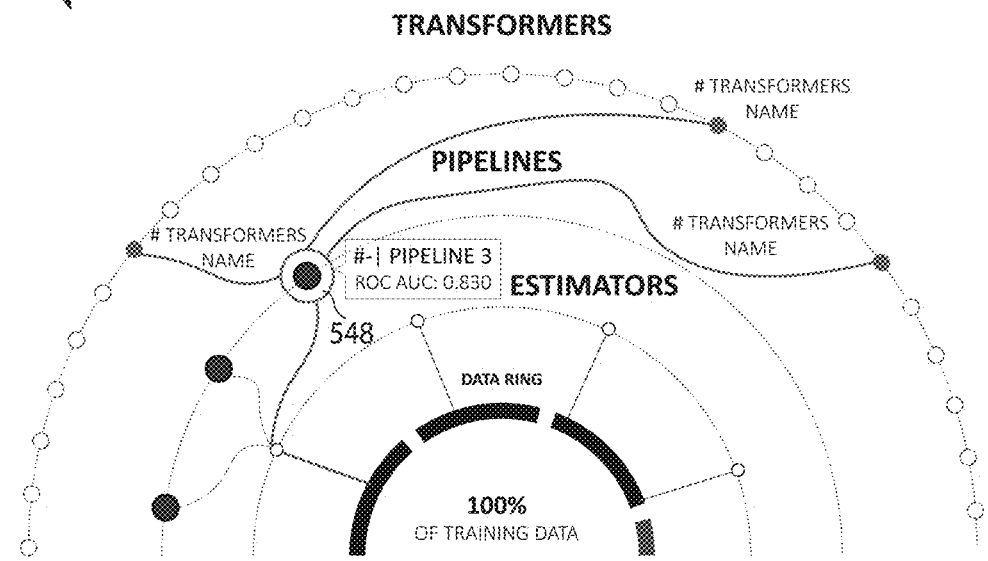

As illustrated in FIG. 5F, feature engineering may be provided such as, for example, where a connection line between a transformer and a pipeline indicates that feature engineering was performed on that pipeline. Hovering (e.g., using a GUI stimuli such as, for example, a mouse) over a pipeline node (e.g., pipeline node 546) may display the associated transformers with a number to indicate the order that the feature was applied to that pipeline.

By way of example only, as a process is running, the connection lines between the transformers and the pipeline may be drawn, mapped, depicted, and/or sketched in the order they are being attempted in the machine learning model generation process. In one aspect, a new node 548 is duplicated from the previous one and a second spinning ring may be added around the node 548 to represent an additional layer of modification/optimization.

Additionally, in an additional aspect as illustrated in FIG. 5F, the new node 548 may be duplicated from the previous one and connections are drawn between the inner and outer arc nodes in the order that the modifiers are being applied. The information for these modifiers may also provide a number value to specify the order in which the modifiers were applied. This same process repeats depending on the initial top number of performers until the process completes, and the user is (at any time) free to interact with the visualization elements, as depicted in FIG. 5G.

Figure 5G:
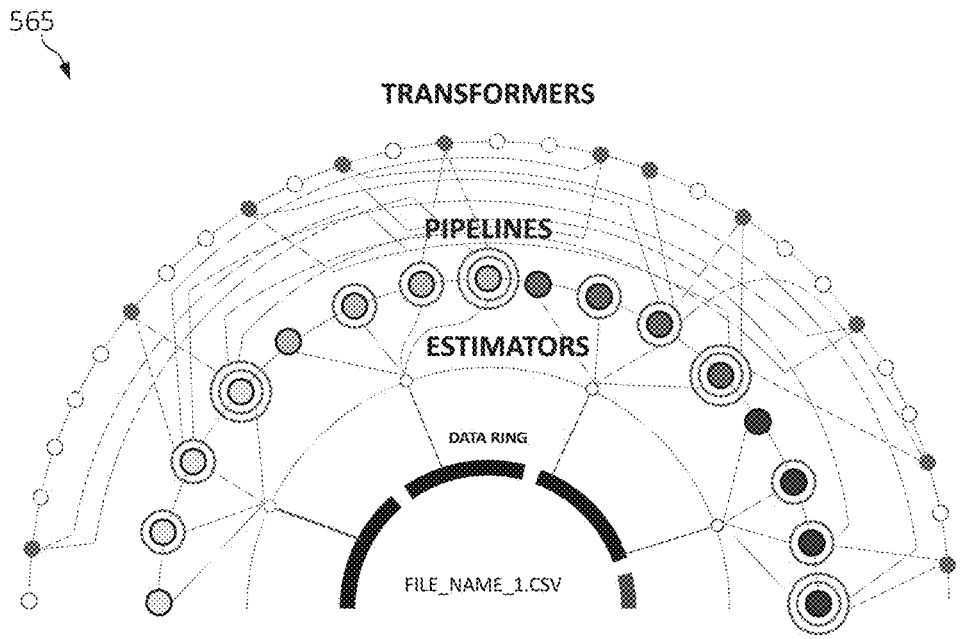

Additionally, FIG. 5G, one or more user interactions (either during or after completion) is depicted. A data set along with percentage of training data as compared to a hold off data set may be represented in either a semi-circle or full circle layout. Engaging in one or more sections of the radial UI visualization 565 such as, for example, selecting or hovering over any visualization node displays a tooltip with contextual information for more detail. Hovering also displays all direct associations with that node, represented with the connection line. The number of rings around a node represent the different layers of optimization/modification. It should be noted, by way of example only, different estimators and transformers have been used during a training for illustration purposes only.

Figure 5H:
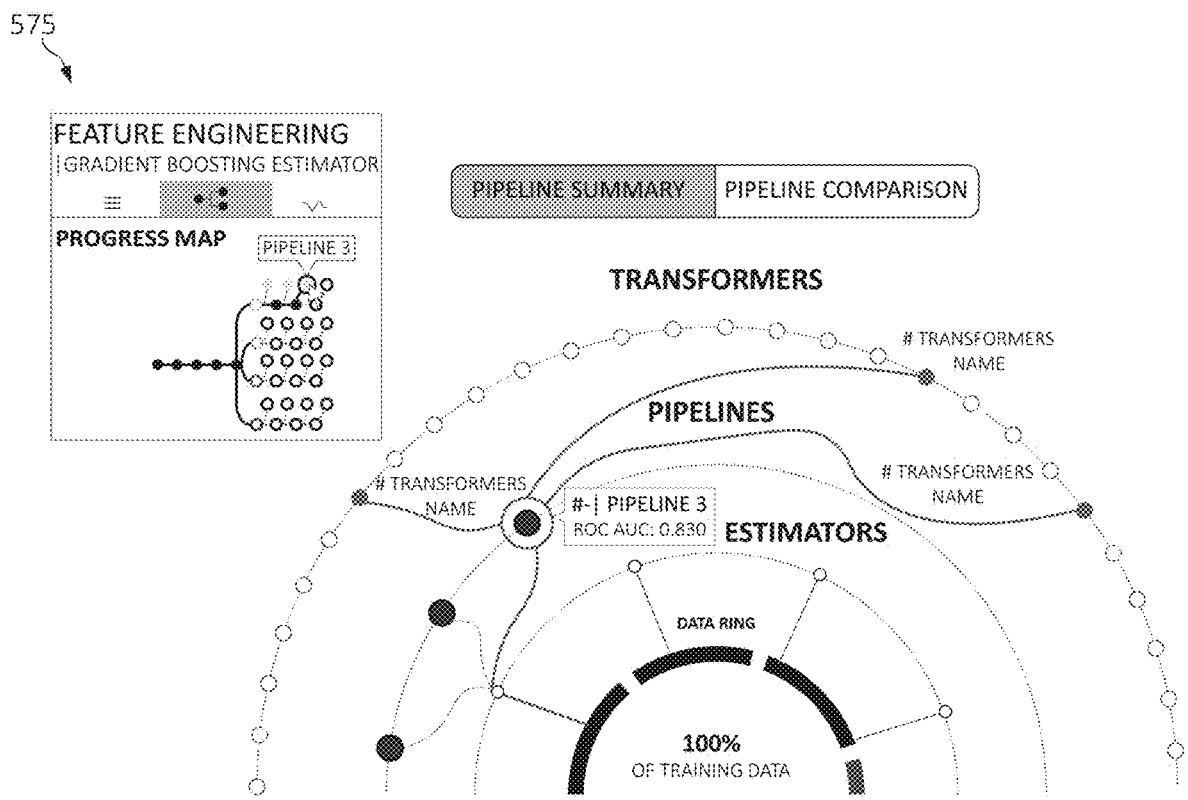
Figures 5I, 5J:
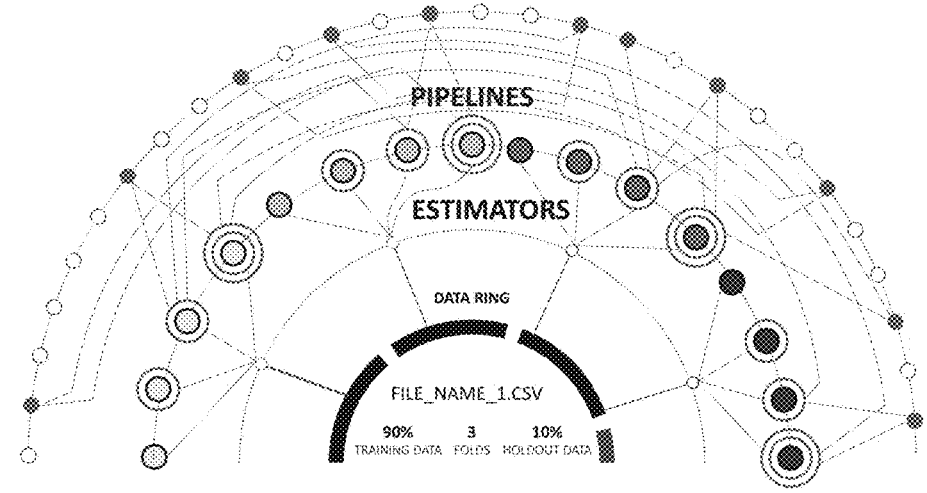

Also, as illustrated in FIG. 5H-5J, any nodes outside of the core can be hovered on, which shows all directly connected nodes along with associated labels. In order to illustrate the linkage between estimators and transformer, the pipeline may be implemented to link them together. Engaging in one or more sections of the radial UI visualization views 575, 585 such as, for example, selecting or hovering over core of the visualization provides additional details about the core node. Hovering over a secondary view (e.g., a progress map 594) highlights the corresponding information in the visualization. Hovering over a legend 592 highlights the corresponding node/arc types that are represented in the visualization. Also, selecting/clicking a node in the visualization scrolls the user to the corresponding table item underneath.

Figure 6:
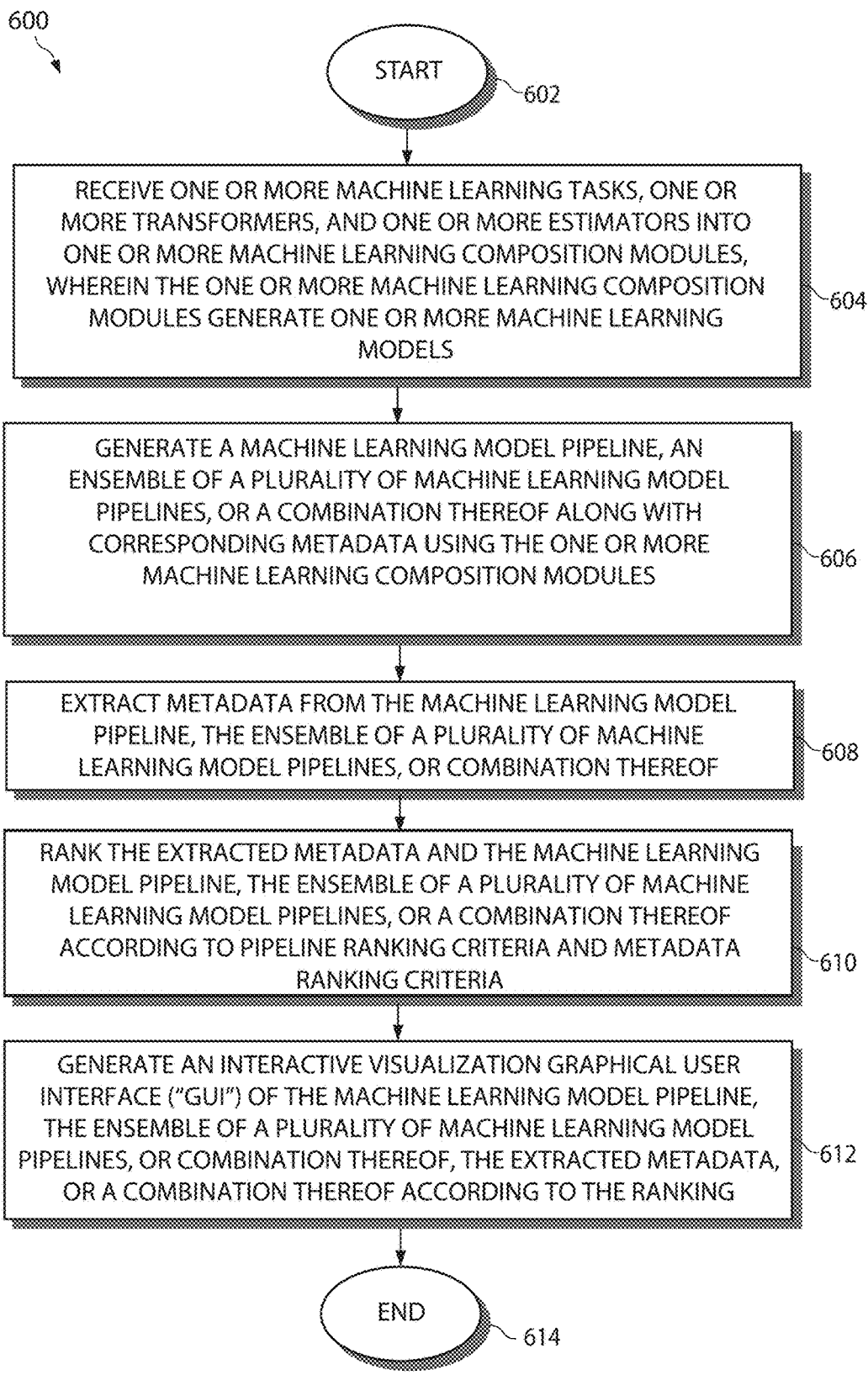
FIG. 6 is a flowchart diagram depicting an exemplary method for providing automated machine learning visualization, again in which various aspects of the present invention may be realized.

FIG. 6 is an additional flowchart diagram 600 depicting an additional exemplary method for automated machine learning visualization, again in which various aspects of the present invention may be realized. The functionality 600 may be implemented as a method executed as instructions on a machine, where the instructions are included on at least one computer readable medium or one non-transitory machine-readable storage medium. The functionality 600 may start in block 602.

Machine learning tasks, transformers, and estimators may be received into one or more machine learning composition modules, as in block 604. In one aspect, receiving the one or more machine learning tasks further includes receiving training data, hold out data, test data, optimization metrics, evaluation metrics, target variable, the one or more transformers, and the one or more estimators into the one or more machine learning composition modules.

The one or more machine learning composition modules generate one or more machine learning models, as in block 606. A machine learning model pipeline, an ensemble of a plurality of machine learning model pipelines, or a combination thereof, along with corresponding metadata, may be generated using the one or more machine learning composition modules, as in block 608. Metadata may be extracted from the machine learning model pipeline, the ensemble of a plurality of machine learning model pipelines, or combination thereof, as in block 610. The extracted metadata and the machine learning model pipeline, the ensemble of a plurality of machine learning model pipelines, or a combination thereof may be ranked according to metadata ranking criteria and pipeline ranking criteria, as in block 612. An interactive visualization graphical user interface ("GUI") of the machine learning model pipeline, the ensemble of a plurality of machine learning model pipelines, or combination thereof, and the extracted metadata may be generated according to the rankings, as in block 614. The functionality 600 may end, as in block 616.

In one aspect, in conjunction with and/or as part of at least one block of FIG. 6, the operations of method 600 may include each of the following. The operations of method 600 may define the metadata for the machine learning model pipeline to include data relating to which of the one or more selected data transformers and the one or more selected data estimators were included in the one or more machine learning composition structures, performance data relating to the one or more machine learning models and the training data, parameter and metric data, and data relating to creation of the one or more machine learning composition structures.

The operations of method 600 may define the metadata for the ensemble of a plurality of machine learning model pipelines to include structure data relating to which of a combination of the plurality of machine learning model pipelines that were included therein, performance data relating to the one or more machine learning models and the training data, and parameter and metric data.

In one aspect, the operations of method 600 may define the metadata for the machine learning model pipeline includes structure metadata, performance metadata, and provenance metadata. The structure metadata for the machine learning model pipeline include the machine learning model pipeline's data transformers and estimator along with the associated parameters and hyper-parameters. The performance metadata includes the machine learning model pipeline's scores for optimization and evaluation metrics of a machine learning task, confusion matrix, ROC/AUC curves, etc. The provenance metadata for the machine learning model pipeline include a machine learning task based on which the machine learning task was created. The machine learning task (for the machine learning model pipeline) also includes training data (or a subset of) used to train the machine learning model pipeline, test or holdout data used to evaluate the machine learning model pipeline, optimization and evaluation metrics, target variable(s), and/or composition modules (e.g., machine learning composition modules and their parameters (if any) that were used to generate the machine learning model pipeline), time of creation, and/or resources taken for creation (compute time, memory, etc.).

In an additional aspect, the operations of method 600 may define the metadata for the ensemble of a plurality of machine learning model pipelines to include structure metadata, performance metadata, and provenance metadata. The structure metadata for the ensemble of a plurality of machine learning model pipelines includes the all of the ensemble's machine learning model pipelines. The performance metadata includes the parameters determining the way the pipelines are ensembled. The performance metadata includes the ensemble's scores for the optimization and evaluation metrics of a machine learning task, confusion matrix, ROC/AUC curves, etc.

The provenance metadata for the for the ensemble of a plurality of machine learning model pipelines include a machine learning task based on which the machine learning task was created. The machine learning task(s) (for the machine learning model pipeline and/or the ensemble of the plurality of machine learning model pipelines) also includes training data (or a subset of) used to train the ensemble of the machine learning model pipelines, test or holdout data used to evaluate the machine learning model pipeline, optimization and evaluation metrics, target variable(s), and/or composition modules (e.g., machine learning composition modules and their parameters (if any) that were used to generate the ensemble of the machine learning model pipelines), time of creation, and/or resources taken for creation (compute time, memory, etc.).

The operations of method 600 may display the interactive visualization GUI as a radial structure having a plurality of concentric rings having one or more nodes displayed therein, wherein the plurality of concentric rings include at least machine learning pipeline rings, data rings, estimator rings, transformer rings, and composition module rings, wherein the one or more nodes represent the machine learning model pipeline, the ensemble of a plurality of machine learning model pipelines, or a combination thereof, the data, the one or more estimators, the one or more transformers, and the machine learning composition modules used to generate the machine learning model pipeline, the ensemble of a plurality of machine learning model pipelines, or a combination thereof, wherein the having one or more nodes in the concentric rings are displayed in sequence based on different ranking criteria.

The operations of method 600 may associate one or more nodes with one or more of the plurality of concentric rings based, associate and displaying details relating to the machine learning model pipeline or the ensemble of a plurality of machine learning model pipelines upon the user interacting with the one or more of the plurality of concentric rings, or display each of the machine learning model pipeline, the ensemble of a plurality of machine learning model pipelines, or combination associated with the one or more selected data transformers, the one or more data estimators, the one or more machine learning composition modules, one or more data partitions, or a combination thereof upon the user interacting with the one or more of the plurality of concentric rings.

The operations of method 600 may automatically update the interactive visualization GUI upon occurrence of one or more triggering events, and/or automatically updating the interactive visualization upon a user 1) selecting ranking criteria of the machine learning model pipeline, the ensemble of a plurality of machine learning model pipelines, or combination thereof, and ranking criteria for the data, transformer, estimator, composition modules for visualization in their corresponding rings, 2) selecting or interacting with one or more nodes located within the interactive visualization of the machine learning model pipeline, the ensemble of a plurality of machine learning model pipelines, or combination thereon, and/or 3) selecting or interacting with one or more nodes for the metadata rings (transformers, estimators, data, composition modules rings) within the interactive visualization GUI.

The operations of method 600 may associate one or more nodes with one or more of the plurality of concentric rings, associate and display details relating to the machine learning model pipeline or the ensemble of a plurality of machine learning model pipelines upon a user interacting with the one or more of the plurality of concentric rings, and/or display each of the machine learning model pipeline, the ensemble of a plurality of machine learning model pipelines, or combination associated with the one or more selected data transformers, the one or more selected data estimators, the one or more machine learning composition structures, one or more data partitions or a combination thereof upon the user interacting with the one or more of the plurality of concentric rings.

The operations of method 600 may automatically update the interactive visualization GUI upon occurrence of one or more triggering events, automatically update the interactive visualization upon a user: selecting ranking criteria of the machine learning model pipeline, the ensemble of a plurality of machine learning model pipelines, or combination thereof; selecting or interacting with one or more nodes located within the interactive visualization of the machine learning model pipeline, the ensemble of a plurality of machine learning model pipelines, or combination thereof; and/or selecting the metadata within the interactive visualization GUI.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing automated machine learning visualization by one or more processors, comprising:
receiving one or more machine learning tasks, one or more transformers, and one or more estimators into machine learning composition logic;
generating a machine learning model pipeline, an ensemble of a plurality of machine learning model pipelines, or a combination thereof along with corresponding metadata using the machine learning composition logic, wherein a machine learning model pipeline is a sequence of transformers and estimators and an ensemble of machine learning pipelines are an ensemble of machine learning pipelines;

extracting metadata from the machine learning model pipeline, the ensemble of a plurality of machine learning model pipelines, or combination thereof; and generating an interactive visualization graphical user interface ("GUI") of the machine learning model pipeline, the ensemble of a plurality of machine learning model pipelines, or combination thereof, the extracted metadata, or a combination thereof;

analyzing the extracted metadata, wherein the extracted metadata includes provenance metadata; and, in conjunction with generating the interactive visualization GUI of the machine learning pipeline, decomposing and displaying, on the interactive visualization GUI, specific algorithms, parameters, and technical characteristics used to generate each machine learning model in the machine learning model pipeline according to the analysis of the extracted metadata and wherein the decomposing and displaying includes displaying, on the interactive visualization GUI, a list of machine learning composition structures, inclusive of specified data and specified machine learning tasks, used to generate each machine learning model in the machine learning model pipeline.

2. The method of claim 1, wherein receiving the one or more machine learning tasks further includes receiving training data, test data, optimization metrics, evaluation metrics, target variable, the one or more transformers, and the one or more estimators into the machine learning composition logic.

3. The method of claim 1, further including:
defining metadata for the machine learning pipeline to include structure metadata, performance metadata, the provenance metadata, or a combination thereof relating to the machine learning pipeline; or
defining metadata for the ensemble of a plurality of machine learning model pipelines to include structure metadata, performance metadata, the provenance metadata, or a combination thereof relating to the ensemble of a plurality of machine learning model pipelines.

4. The method of claim 1, further including:
ranking the extracted metadata and the machine learning model pipeline, the ensemble of a plurality of machine learning model pipelines, or a combination thereof according to pipeline ranking criteria and metadata ranking criteria;
ranking structure metadata, performance metadata, the provenance metadata, or a combination thereof for the machine learning pipeline according to the metadata ranking criteria; or
ranking the structure metadata, the performance metadata, the provenance metadata, or a combination thereof for the ensemble of a plurality of machine learning model pipelines according to the metadata ranking criteria.

5. The method of claim 1, further including displaying the interactive visualization GUI as a radial structure having a plurality of concentric rings having one or more nodes displayed therein, wherein the plurality of concentric rings include at least machine learning pipeline rings, data rings, estimator rings, transformer rings, and composition logic rings, wherein the one or more nodes represent the machine learning model pipeline, the ensemble of a plurality of machine learning model pipelines, or combination thereof, data, the one or more estimators, the one or more transformers, and the machine learning composition logic used to generate the machine learning model pipeline, the ensemble of a plurality of machine learning model pipelines, or a combination thereof, wherein the having one or more nodes in the plurality of concentric rings are displayed in sequence based on different ranking criteria.

6. The method of claim 5, further including:
associating one or more nodes with one or more of the plurality of concentric rings;
associating and displaying details relating to the machine learning model pipeline or the ensemble of a plurality of machine learning model pipelines as the user interacts with the one or more of the plurality of concentric rings; or
displaying each of the machine learning model pipeline, the ensemble of a plurality of machine learning model pipelines, or combination associated with the one or more selected data transformers, the one or more data estimators, the machine learning composition logic, one or more data partitions, or a combination thereof upon the user interacting with the one or more of the plurality of concentric rings.

7. The method of claim 5, further including:
automatically updating the interactive visualization GUI according to one or more triggering events, or
automatically updating the interactive visualization upon a user:
selecting the pipeline ranking criteria and the metadata ranking criteria of the machine learning model pipeline, the ensemble of a plurality of machine learning model pipelines, or combination thereof the one or more transformers, the one or more estimators, the one or more machine learning composition modules, or a combination thereof for visualization in one or more corresponding rings of the interactive visualization;
selecting or interacting with one or more nodes located within the interactive visualization of the machine learning model pipeline, the ensemble of a plurality of machine learning model pipelines, or combination thereof; or
selecting or interacting with one or more nodes for of one or more of a plurality of metadata rings within the interactive visualization GUI, wherein the plurality of metadata rings include transformer rings, estimators rings, data rings, and composition modules rings.

8. A system for providing automated machine learning visualization, comprising:
one or more computers with executable instructions that when executed cause the system to:
receive one or more machine learning tasks, one or more transformers, and one or more estimators into machine learning composition logic;
generate a machine learning model pipeline, an ensemble of a plurality of machine learning model pipelines, or a combination thereof along with corresponding metadata using the machine learning composition logic, wherein a machine learning model pipeline is a sequence of transformers and estimators and an ensemble of machine learning pipelines are an ensemble of machine learning pipelines;
extract metadata from the machine learning model pipeline, the ensemble of a plurality of machine learning model pipelines, or combination thereof;

generate an interactive visualization graphical user interface ("GUI") of the machine learning model pipeline, the ensemble of a plurality of machine learning model pipelines, or combination thereof, the extracted metadata, or a combination thereof;

analyze the extracted metadata, wherein the extracted metadata includes provenance metadata; and, in conjunction with generating the interactive visualization GUI of the machine learning pipeline, decompose and display on the interactive visualization GUI specific algorithms, parameters, and technical characteristics used to generate each machine learning model in the machine learning model pipeline according to the analysis of the extracted metadata, and wherein the decomposing and displaying includes displaying, on the interactive visualization GUI, a list of machine learning composition structures, inclusive of specified data and specified machine learning tasks, used to generate each machine learning model in the machine learning model pipeline.

9. The system of claim 8, wherein the executable instructions for receiving the one or more machine learning tasks further include receiving training data, test data, optimization metrics, evaluation metrics, target variable, the one or more transformers, and the one or more estimators into the machine learning composition logic.

10. The system of claim 8, wherein the executable instructions further:

define metadata for the machine learning pipeline to include structure metadata, performance metadata, the provenance metadata, or a combination thereof relating to the machine learning pipeline; or define metadata for the ensemble of a plurality of machine learning model pipelines to include structure metadata, performance metadata, the provenance metadata, or a combination thereof relating to the ensemble of a plurality of machine learning model pipelines.

11. The system of claim 8, wherein the executable instructions further:

rank the extracted metadata and the machine learning model pipeline, the ensemble of a plurality of machine learning model pipelines, or a combination thereof according to pipeline ranking criteria and metadata ranking criteria;

rank structure metadata, performance metadata, the provenance metadata, or a combination thereof for the machine learning pipeline according to the metadata ranking criteria; or rank the structure metadata, the performance metadata, the provenance metadata, or a combination thereof for the ensemble of a plurality of machine learning model pipelines according to the metadata ranking criteria.

12. The system of claim 8, wherein the executable instructions further display the interactive visualization GUI as a radial structure having a plurality of concentric rings having one or more nodes displayed therein, wherein the plurality of concentric rings include at least machine learning pipeline rings, data rings, estimator rings, transformer rings, and composition logic rings, wherein the one or more nodes represent the machine learning model pipeline, the ensemble of a plurality of machine learning model pipelines, or a combination thereof, data, the one or more estimators, the one or more transformers, and the machine learning composition logic used to generate the machine learning model pipeline, the ensemble of a plurality of machine learning model pipelines, or a combination thereof, wherein the having one or more nodes in the plurality of concentric rings are displayed in sequence based on different ranking criteria.

13. The system of claim 8, wherein the executable instructions further:

associate one or more nodes with one or more of the plurality of concentric rings;

associate and display details relating to the machine learning model pipeline or the ensemble of a plurality of machine learning model pipelines as the user interacts with the one or more of the plurality of concentric rings; or display each of the machine learning model pipeline, the ensemble of a plurality of machine learning model pipelines, or combination associated with the one or more selected data transformers, the one or more data estimators, the machine learning composition logic, one or more data partitions, or a combination thereof upon the user interacting with the one or more of the plurality of concentric rings.

14. The system of claim 8, wherein the executable instructions further:

automatically update the interactive visualization GUI according to one or more triggering events, or automatically update the interactive visualization upon a user:

selecting the pipeline ranking criteria and the metadata ranking criteria of the machine learning model pipeline, the ensemble of a plurality of machine learning model pipelines, or combination thereof the one or more transformers, the one or more estimators, the machine learning composition logic, or a combination thereof for visualization in one or more corresponding rings of the interactive visualization;

selecting or interacting with one or more nodes located within the interactive visualization of the machine learning model pipeline, the ensemble of a plurality of machine learning model pipelines, or combination thereof; or selecting or interacting with one or more nodes for of one or more of a plurality of metadata rings within the interactive visualization GUI, wherein the plurality of metadata rings include transformer rings, estimators rinds, data rings, and composition modules rings.

15. A computer program product for providing automated machine learning visualization by a processor, the computer program product comprising a non-transitory computer-readable storage medium having computer-readable program code portions stored therein, the computer-readable program code portions comprising:

an executable portion that receives one or more machine learning tasks, one or more transformers, and one or more estimators into machine learning composition logic;

an executable portion that generates a machine learning model pipeline, an ensemble of a plurality of machine learning model pipelines, or a combination thereof along with corresponding metadata using the machine learning composition logic, wherein a machine learning model pipeline is a sequence of transformers and estimators and an ensemble of machine learning pipelines are an ensemble of machine learning pipelines;

an executable portion that extracts metadata from the machine learning model pipeline, the ensemble of a plurality of machine learning model pipelines, or combination thereof;

an executable portion that generates an interactive visualization graphical user interface ("GUI") of the machine learning model pipeline, the ensemble of a plurality of machine learning model pipelines, or combination thereof, the extracted metadata, or a combination thereof;

an executable portion, that analyzes the extracted metadata, wherein the extracted metadata includes provenance metadata; and an executable portion that, in conjunction with generating the interactive visualization GUI of the machine learning pipeline, decomposes and displays on the interactive visualization GUI specific algorithms, parameters, and technical characteristics used to generate each machine learning model in the machine learning model pipeline according to the analysis of the extracted metadata and wherein the decomposing and displaying includes displaying, on the interactive visualization GUI, a list of machine learning composition structures, inclusive of specified data and specified machine learning tasks, used to generate each machine learning model in the machine learning model pipeline.

16. The computer program product of claim 15, wherein the executable portion that executable portion that receives the one or more machine learning tasks further receives in the one or more machine learning tasks training data, test data, optimization metrics, evaluation metrics, target variable, the one or more transformers, and the one or more estimators into the machine learning composition logic.

17. The computer program product of claim 15, further including an executable portion that:
defines metadata for the machine learning pipeline to include structure metadata, performance metadata, the provenance metadata, or a combination thereof relating to the machine learning pipeline; or
defines metadata for the ensemble of a plurality of machine learning model pipelines to include structure metadata, performance metadata, the provenance metadata, or a combination thereof relating to the ensemble of a plurality of machine learning model pipelines.

18. The computer program product of claim 15, further including an executable portion that:
ranks the extracted metadata and the machine learning model pipeline, the ensemble of a plurality of machine learning model pipelines, or a combination thereof according to pipeline ranking criteria and metadata ranking criteria;
ranks structure metadata, performance metadata, the provenance metadata, or a combination thereof for the machine learning pipeline according to the metadata ranking criteria; or
ranks the structure metadata, the performance metadata, the provenance metadata, or a combination thereof for the ensemble of a plurality of machine learning model pipelines according to the metadata ranking criteria.

19. The computer program product of claim 15, further including an executable portion that display the interactive visualization GUI as a radial structure having a plurality of concentric rings having one or more nodes displayed therein, wherein the plurality of concentric rings include at least machine learning pipeline rings, data rings, estimator rings, transformer rings, and composition logic rings, wherein the one or more nodes represent the machine learning model pipeline, the ensemble of a plurality of machine learning model pipelines, or a combination thereof, data, the one or more estimators, the one or more transformers, and the machine learning composition logic used to generate the machine learning model pipeline, the ensemble of a plurality of machine learning model pipelines, or a combination thereof, wherein the having one or more nodes in the plurality of concentric rings are displayed in sequence based on different ranking criteria.

20. The computer program product of claim 15, further including an executable portion that:
associates one or more nodes with one or more of the plurality of concentric rings;
associates and display details relating to the machine learning model pipeline or the ensemble of a plurality of machine learning model pipelines as the user interacts with the one or more of the plurality of concentric rings; or
displays each of the machine learning model pipeline, the ensemble of a plurality of machine learning model pipelines, or combination associated with the one or more selected data transformers, the one or more data estimators, the machine learning composition logic, one or more data partitions, or a combination thereof upon the user interacting with the one or more of the plurality of concentric rings.

21. The computer program product of claim 15, further including an executable portion that:
automatically updates the interactive visualization GUI according to one or more triggering events, or
automatically updates the interactive visualization upon a user:
selecting the pipeline ranking criteria and the metadata ranking criteria of the machine learning model pipeline, the ensemble of a plurality of machine learning model pipelines, or combination thereof the one or more transformers, the one or more estimators, the machine learning composition logic, or a combination thereof for visualization in one or more corresponding rings of the interactive visualization;
selecting or interacting with one or more nodes located within the interactive visualization of the machine learning model pipeline, the ensemble of a plurality of machine learning model pipelines, or combination thereof; or
selecting or interacting with one or more nodes for of one or more of a plurality of metadata rings within the interactive visualization GUI, wherein the plurality of metadata rings include transformer rings, estimators rinds, data rings, and composition modules rings.

\* \* \* \* \*